(12) United States Patent
Tsiatsis et al.

(10) Patent No.: US 10,021,636 B2
(45) Date of Patent: Jul. 10, 2018

(54) METHODS, APPARATUSES, AND COMPUTER PROGRAM PRODUCTS FOR CONFIGURING AND COLLECTING INFORMATION FROM SLEEPY DEVICES

(71) Applicant: Telefonaktiebolaget LM Ericsson (publ), Stockholm (SE)

(72) Inventors: Vlasios Tsiatsis, Solna (SE); Sébastien Pierrel, Sundbyberg (SE); Konstantinos Vandikas, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 195 days.

(21) Appl. No.: 14/917,232

(22) PCT Filed: Sep. 18, 2013

(86) PCT No.: PCT/SE2013/051090
§ 371 (c)(1),
(2) Date: Mar. 7, 2016

(87) PCT Pub. No.: WO2015/041577
PCT Pub. Date: Mar. 26, 2015

(65) Prior Publication Data
US 2016/0198404 A1 Jul. 7, 2016

(51) Int. Cl.
*H04W 52/02* (2009.01)
*H04L 12/24* (2006.01)
*H04W 84/18* (2009.01)

(52) U.S. Cl.
CPC ........... *H04W 52/02* (2013.01); *H04L 41/084* (2013.01); *H04W 52/0248* (2013.01); *H04W 84/18* (2013.01); *Y02D 70/00* (2018.01); *Y02D 70/142* (2018.01); *Y02D 70/162* (2018.01)

(58) Field of Classification Search
CPC H04L 41/084; H04W 52/02; H04W 52/0248; H04W 84/18; Y02B 60/50
See application file for complete search history.

(56) References Cited

U.S. PATENT DOCUMENTS

2006/0209715 A1 9/2006 Kushalnagar et al.
2007/0185660 A1 8/2007 Anderson
(Continued)

OTHER PUBLICATIONS

International Search Report, Application No. PCT/SE2013/051090, dated Sep. 3, 2014.
(Continued)

*Primary Examiner* — Asad Nawaz
*Assistant Examiner* — Zhaohui Yang
(74) *Attorney, Agent, or Firm* — Sage Patent Group

(57) ABSTRACT

Methods for deploying a new sensor in a sensor network having an existing sensor are provided. A method includes receiving information relating to the new sensor and obtaining deployment information relating to the existing sensor. The method further includes determining similarity information for the new sensor based on the received information relating to the new sensor and the obtained deployment information relating to the existing sensor; and based at least in part on the similarity information, determining a sleeping pattern for the new sensor. The new sensor is then configured in accordance with the determined sleeping pattern.

15 Claims, 12 Drawing Sheets

(56) References Cited

U.S. PATENT DOCUMENTS

2009/0228611 A1      9/2009  Ferguson et al.
2015/0043409 A1*     2/2015  Choi ................. H04W 52/0216
                                                                370/311

OTHER PUBLICATIONS

Written Opinion of the International Searching Authority, Application No. PCT/SE2013/051090, dated Sep. 3, 2014.
Barnaghi, "SENSEI: An Architecture for the Real World Internet", *First International Workshop on Semantic Interoperability for Smart Spaces (SISS 2010)*, Riccione, Italy, Jun. 2010, 76 pp.
Han et al., "Application-aware integration of data collection and power management in wireless sensor networks", *Journal of Parallel and Distributed Computing*, vol. 67, Issue 9, Sep. 2007, pp. 992-1006.

* cited by examiner

METHODS, APPARATUSES, AND COMPUTER PROGRAM PRODUCTS FOR CONFIGURING AND COLLECTING INFORMATION FROM SLEEPY DEVICES

CROSS REFERENCE TO RELATED APPLICATION

This application is a 35 U.S.C. § 371 national stage application of PCT International Application No. PCT/SE2013/051090, filed on Sep. 18, 2013, the disclosure and content of which is incorporated by reference herein in its entirety. The above-referenced PCT International Application was published in the English language as International Publication No. WO 2015/041577 A1 on Mar. 26, 2015.

TECHNICAL FIELD

This disclosure relates generally to configuring and collecting information from sleepy devices, such as sleepy devices that are part of a sensor network.

BACKGROUND

An exemplary sensor network 100 is shown in FIG. 1. In this example, a number of sensor nodes 110 are connected through a gateway 112 to the internet 106 so that an application (APP) 108 can obtain data generated by a sensor node 110. The sensor nodes 110 may include one or more sensors (a.k.a., "resources"). In the illustrated example, sensor node 110 includes two resources, R1,1 and R1,N (e.g., a temperature sensor and a smoke detector). The sensor node 110 may also include a processor and a transceiver for sending and receiving data, such as a WiFi or ZigBee transceiver. In some configurations, the sensor nodes, and/or one or more sensors of the sensor node, may be sleeping periodically, otherwise known as "duty-cycling," in order to limit their energy consumption. Thus, sensor nodes and sensors may be referred to as "sleepy" devices.

As shown in FIG. 1, network 100 may also include a Resource Directory (RD) 102 and a Mirror Proxy (MP) 104. These nodes help to provide application support for discovering relevant sleepy devices, such as sensors. The RD 102 contains reachability information for each registered sleepy device, such as its GW IP address or its own IP address if applicable, and metadata, such as the type of device (e.g., sensor, actuator, parameter, etc.), the associated sensor(s), etc. Another example of metadata is the units of measurement of the measured sensor modality; for example, if the sensor of the device is a temperature sensor, a request to the device for sensor data could result in the retrieval of a value expressed in degrees Celcius. The MP 104 contains recent information generated by a sensor. This information may be provided to the MP 104, for example, by the sensor itself when it is in an "awake" state.

As described in *Application-aware Integration of Data Collection and Power Management in Wireless Sensor Networks*, by Qi et al., J. Parallel Distrib. Comput. 67(9): 992-10006 (2007), a request from an application 108 can be directed to the MP 104, or alternatively, to the actual sensor, depending on the "accuracy" requirements of the application. For example, if an application requires a highly accurate temperature reading (e.g., the most up-to-date temperature reading), then in many circumstances it would be better for the application to send the request directly to the sensor (assuming the sensor is not sleeping). On the other hand, if the application does not require such an accurate temperature reading, then it may be acceptable for the application to obtain the temperature measurement data from the proxy.

There is a need for methods, apparatuses, and computer program products that can effectively meet application accuracy requirements while at the same time reducing energy consumption in the sensor network.

SUMMARY

According to some embodiments, the methods, apparatuses, and computer program products described herein provide for configuring and collecting information from one or more sleepy devices (e.g., sensors in a sensor network), as well as deploying new sleepy devices. The significant advantages that result from the embodiments described herein include the ability to effectively account for redundancy between sleepy devices, as well as the ability to calculate and (re)configure sleeping patterns (a.k.a., sleeping schedules) to maximize efficiency.

In certain aspects, a sleeping pattern configurator, which may implement an adaptive algorithm, is provided to govern the interaction between an application, gateway, and one or more sleepy devices. The sleeping pattern configurator, and thus adaptive algorithm, may take into account the properties of the device, such as the demand for use of the device, the amount of battery life available to the device, as well as the cost of transmitting information to and from the device. In some aspects, a mirror proxy (e.g., data storage device) may be used for storing recently accumulated information from the devices in order to avoid directly contacting a sleepy device. In some aspects, if a device will not have enough power to complete a request, it will push data to a mirror proxy when able, and in some instances, raise an alarm regarding power.

In some embodiments a method for deploying a new sensor in a sensor network having one or more existing sensors is provided, wherein the new sensor and at least some of the existing sensors in the network are sleepy devices. The method includes receiving information relating to the new sensor, obtaining deployment information relating to an existing sensor, and determining similarity information for the new sensor based on the received information relating to the new sensor as well as the obtained deployment information relating to the existing sensor. Then, based at least in part on the similarity information, the method includes determining a sleeping pattern for the new sensor. The new sensor can be configured in accordance with the determined sleeping pattern.

In some embodiments, the method includes calculating an initial sleeping pattern based at least in part on the similarity information and topology information of the sensor network and transmitting the calculated initial sleeping pattern to a sleeping pattern configurator. The method may also include receiving, from the sleeping pattern configurator, the sleeping pattern for the new sensor. The sleeping pattern may be determined such that the new sensor has a duty cycle or awake-state duration that is different than at least one of the existing sensors.

In some embodiments, the information relating to the new sensor includes a sensor identification and contextual information. Further, the information relating to the new sensor may include one or more of location, sensor capabilities, and manufacturer.

In some embodiments, a method for retrieving information from one or more sensors in a sensor network is provided. The method includes receiving a request for information from the APP. The method also includes identifying a set of relevant sensors based on the request, as well as deployment information of the sensor network. The method further includes determining if one or more sensors in the set of relevant sensors are awake. If one or more devices in the set of relevant devices are awake, information responsive to the request is retrieved from one or more of the awake sensors. If no sensor in the set of relevant sensors is awake, the method includes retrieving, from a database, information responsive to the request. Determining if one or more sensors in the set of relevant sensors are awake may include, for example, retrieving sleep pattern information from a resource directory.

In some embodiments, identifying a set of relevant sensors includes generating a set of sensors based on the information request and sorting the set of sensors based on deployment information. The deployment information could include, for example, one or more of device capability, device location, and prior information transmission to or from the device. Also, the deployment information could include similarity information with respect to at least two other devices in the set of relevant sensors.

In some embodiments, the method may further include reconfiguring one or more of the sensors in the set of relevant sensors. The reconfiguration may include adjusting a duty cycle or awake-state duration of the one or more sensors. The reconfiguration may be based at least in part on one or more of: (a) a result of determining if one or more sensors in the set of relevant sensors is awake; (b) a battery life or battery capacity of one or more sensors in the set of relevant sensors; (c) a location of one or more sensors in the set of relevant sensors; and (d) a number of requests that a device in the set of relevant sensors has received.

In some embodiments, a deployment apparatus is provided. The deployment apparatus may be adapted to receive information relating to a new sensor in a sensor network having an existing sensor, obtain deployment information relating to the existing sensor, and determine similarity information for the new sensor based on the received information relating to the new sensor, as well as the obtained deployment information relating to the existing sensor. The deployment apparatus may be further adapted to, based at least in part on the determined similarity information, determine a sleeping pattern for new sensor. The deployment apparatus may further configure the new sensor in accordance with the determined sleeping pattern.

In some embodiments, an apparatus for retrieving information from one or more sensors in a sensor network is provided. The apparatus is adapted to receive a request for information, identify a set of relevant sensors based on the request and deployment information of the sensor network, and determine if one or more sensors in the set of relevant sensors is awake. If one or more devices in the set of relevant devices are awake, the apparatus is adapted to retrieve from one or more of the awake sensors information responsive to the request. If no sensors in the set of relevant sensors are awake, then the apparatus is adapted to retrieve information responsive to the request from a database.

In some embodiments, the apparatus is adapted to identify a set of relevant sensors by generating a set of sensors based on the information request, and sorting the set of sensors based on the deployment information.

The apparatus may also be adapted to reconfigure one or more sensors of the set of relevant sensors, where the reconfiguring includes adjusting a duty cycle or awake-state duration of the one or more sensors. The reconfiguration may be based at least in part on one or more of: (a) a result of the determining if one or more sensors in the set of relevant sensors is awake; (b) a battery life or battery capacity of one or more sensors in the set of relevant sensors; (c) a location of one or more sensors in the set of relevant sensors; and (d) a number of requests that a device in the set of relevant sensors has received.

In some embodiments, a computer program is provided that comprises computer readable code units that, when run on an apparatus, causes the apparatus to receive information relating to a new sensor in a sensor network having an existing sensor and obtain deployment information relating to the existing sensor. The apparatus will also determine similarity information for the new sensor based on the received information relating to the new sensor and the obtained deployment information relating to the existing sensor. Based at least in part on the similarity information, the program will cause the apparatus to determine a sleeping pattern for the new sensor and configure it in accordance with the determined sleeping pattern.

In some embodiments, a computer program is provided that comprises computer readable code units that, when run on an apparatus, causes the apparatus to receive a request for information, identify a set of relevant sensors based on the request and deployment information of the sensor network, and determine if one or more sensors in the set of relevant sensors is awake. If one or more devices in the set of relevant sensors is awake, the apparatus retrieves from one or more of the awake sensors information responsive to the request, and if no sensors in the set of relevant sensors are awake, retrieves information responsive to the request from a database.

According to some embodiments, a computer program product comprising a non-transitory computer readable medium may store the above-described computer programs.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Particular embodiments are directed to methods, devices, and computer program products for retrieving information from one or more sensors in a sensor network, and deploying new sensors.

Current approaches in sensor networks merely provide mechanisms for waking up sleepy devices that are currently disabled or in a "sleepy" state. As such, there is a need for a mechanism that controls a sleepy device's sleep pattern, which takes into consideration certain requirements, such as: the demand for data from the specific sleepy device, the time period where such demands occur, the available battery life or capacity that a sleepy device may have, the associated costs for waking up the sleepy device and for transmitting information from the device, the type of device (e.g., battery powered or energy harvesting), and possible redundancies that may exist in a network. These redundancies may include, for example, the fact that another similar sleepy device may be able to provide the same data. Additionally, in some embodiments, a similarity node may be introduced into the architecture that enables the property of redundancy in a sensor node deployment to be effectively utilized. Similarity information may also be used to calculate and (re)configure sensor node sleeping patterns.

Figure 2:
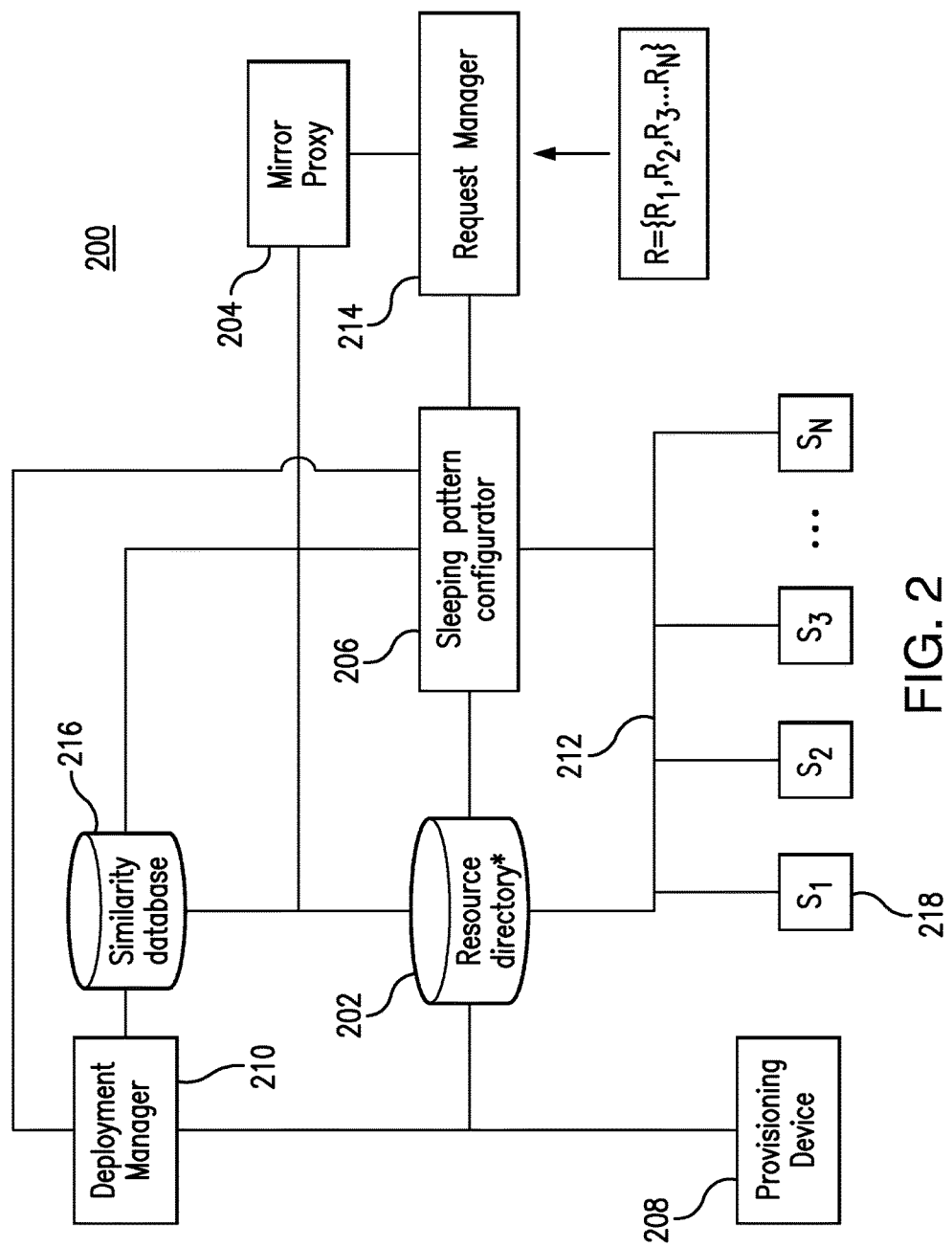
FIG. 2 is an illustration of a network in accordance with exemplary embodiments.

Referring now to FIG. 2, an illustration of a network 200 in accordance with exemplary embodiments is provided. The network 200 may be, for example, associated with a sensor network and can include a number of components. For instance, network 200 may include a resource directory (RD) 202, a mirror proxy (MP) 204, a sleeping pattern configurator 206, a provisioning device 208, a deployment manager 210, a sensor network 212 comprised of sensors nodes 218, a request manager 214, and a similarity database 216. One of ordinary skill in the art will recognize that the various components of network 200, without loss of generality, may be embodied as distinct and/or separate devices, as well as in combined units.

Figure 1:
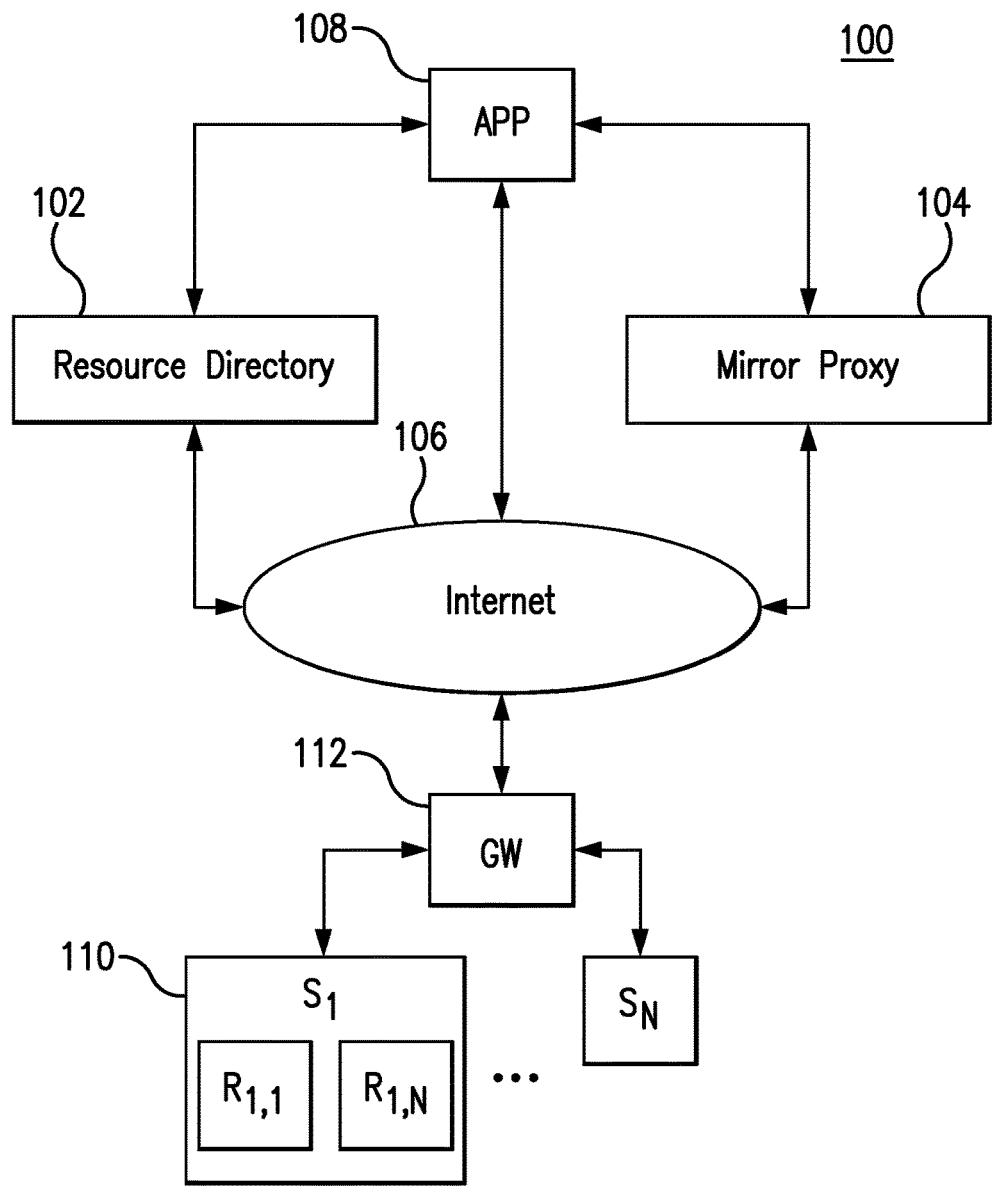
FIG. 1 is an illustration of an exemplary sensor network.

In the example of FIG. 2, sensor node 218 may include one or more sensors. These sensors, as wells as multiple sensor nodes, may be connected either directly or indirectly, for instance, by means of a message bus. As discussed above with respect to the devices of FIG. 1, each sensor node 218 may be understood as consisting of a number of sensors. Exemplary sensors may include one or more of temperature, smoke or carbon monoxide, precipitation, light, and motion sensing capabilities.

RD 202 shown in FIG. 2 may be an IETF standardized node, or a modified implementation. For instance, RD 202 may be extended so that it contains the sleeping patterns of the different devices (hence the usage of the asterisk in the diagram to illustrate that RD 202 is not a conventional IETF RD). In some cases, both sensor nodes and individual sensors can sleep, and as a result, a sensor node may be awake while one or more of its sensors are not. As such, although a sensor node 218 may be awake, it may be limited with respect to the information it can provide at that time. In some cases, if a sensor node is asleep then all of its sensors are asleep. In some embodiments, the information stored in RD 202 includes the temporal availability of sensors and sensor nodes. For instance, RD 202 may include a look-up table that correlates the awake and asleep states of devices to specific time periods.

Mirror proxy 204 caches information produced by a sensor node 218 (e.g., a sensor node's recent temperature reading). In some embodiments, MP 204, as shown in FIG. 2, may be arranged such that updates to the information stored in the MP 204 can be provided, or otherwise initiated, by the sensor nodes 218 of network 200. Additionally, MP 204 may also be updated by a third party, e.g. request manager 214.

The use of MP 204 along with the similarity database 216 is particularly advantageous if there is a redundancy in the deployment of sensor nodes 218. If there are physically redundant/similar sensor nodes 218 that can provide redundant/similar information, for instance, if they have similar types of sensors in a similar location, then their cached information should be similar as well. For example, if MP 204 caches a reading from a first and a second temperature sensor node and the two nodes are close to each other (e.g., in the same corridor), and one of these nodes is sleeping, then the MP 204 can assume that their cached data are also similar.

Similarity database 216 provides information regarding the various devices of network 200, include deployed sensor nodes and their corresponding sensors and capabilities. In some embodiments, similarity database 216 also provides information regarding the relationships between, and similarity of, sensor nodes and individual sensors in the network 200. For instance, database 216 may be embodied as a data storage device that contains mappings between different sensor nodes and their relationships. Thus, it may contain a description of how similar (or different) devices are with respect to their capabilities (e.g. they both have temperature sensors) or with respect to their location (e.g. nodes positioned closer in space can potentially observe the same phenomena) or with respect to information (e.g. a mirror proxy information representation is similar to the real sensor resource representation, but had been previously accessed and stored). In some embodiments, an input source to the similarity database can be map information regarding physical structures, either indoor or outdoor, where obstacles can be used to refine one or more proximity assumption. For instance, in some embodiments, if there exists a wall between two temperature sensors, then it may be assumed that the sensor resources are not particularly similar, since they will not provide a measurement of the same room temperature. The similarity database may also contain more granular similarity information between not only physical devices but also resources on sensor nodes. For example an entry in the similar database may associate one resource R1,1 from sensor node S1 with another resource R1,N from sensor node S1.

In some embodiments, request manager 214 is used for configuring and/or reconfiguring the sleeping patterns of different sleepy devices or their resources, such as sensor node 218 and/or one or more sensors therein. An example of such (re)configuration would be to force a sensor to stay awake longer than the period defined by its original deployment in order to meet the demands of various different requests. In certain aspects, for multiple requests targeted to the same information, request manager 214 can use MP 204, provided that the MP 204 is updated while the sensor node 218 and/or sensors are awake and servicing requests. In some embodiments, a sensor node 218 or an individual sensor may have its behavior modified so that it is scheduled to wake up and update the MP 204 at later time, assuming that a third party, such as request manager 214, updates the mirror proxy on its behalf.

In the example of FIG. 2, a deployment manager 210 may receive input from a provisioning device 208. In some embodiments, the deployment manager 210 translates this information to the formats expected by the RD 202 and the similarity database 216. In this example, the deployment manager effectively acts as a third party updater of the resource directory information regarding sensor capabilities. As a result, deployment manager 210 and the sensor node can both update the resource directory 202 with different information (e.g. deployment manager updates the physical location of the sensor node hosting the resources while the sensor node updates the resource directory 202 with resource access metadata.)

Provisioning device 208 may be any number of devices. For instance, it may be any device that can be used on-site to record information regarding available sensor devices and their characteristics in such a way that can be later on be reported to the RD 202 and the similarity database 216. In some embodiments, provisioning device 208 may be an access node external to network 200, such as a computer terminal or user equipment (UE) associated with a newly deployed sensor. In some embodiments, the provisioning device 208 may be co-located with a sensor node 218.

In some embodiments, a sleeping pattern configurator node 206 may be used. In such a deployment, the node 206 is responsible for configuring/reconfiguring the sleeping cycles of the different sensors deployed in the network. One of ordinary skill will recognize that the configurator and its associated functionality may be implemented in one or more other nodes of network 200.

Figure 3:
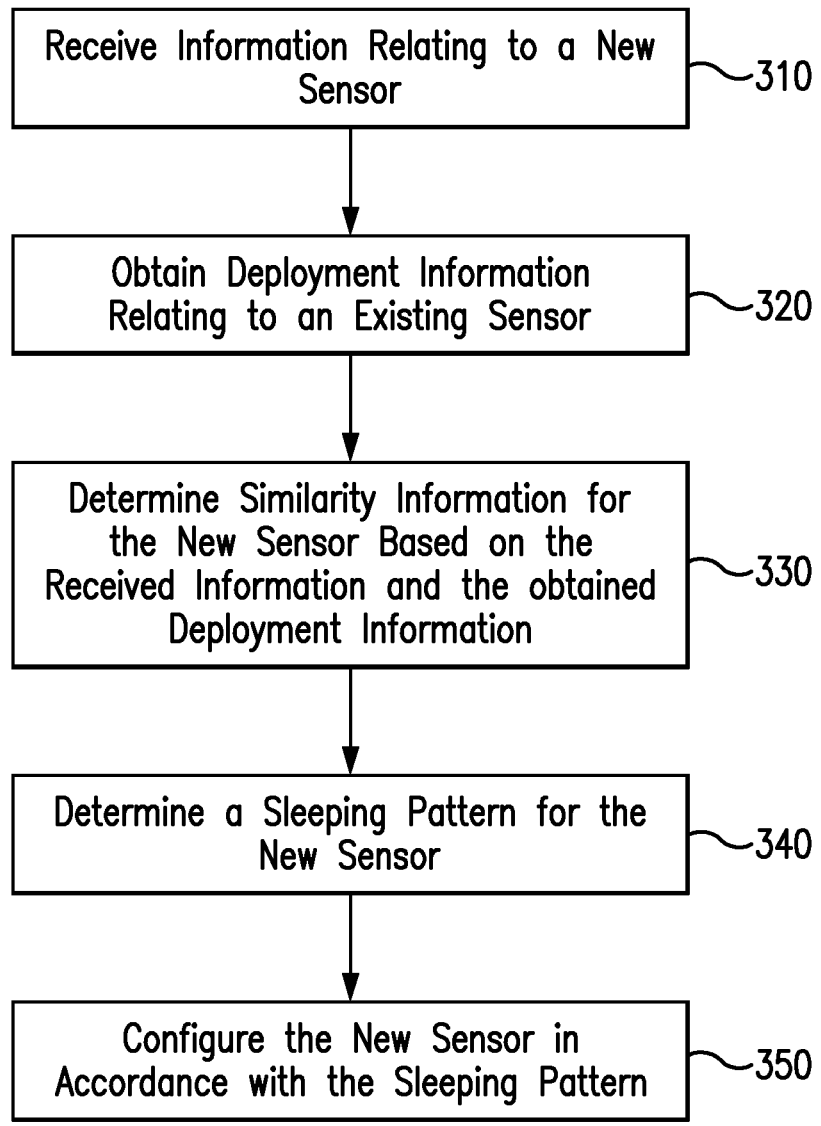
FIG. 3 is a flow chart illustrating a configuration process in accordance with exemplary embodiments.

Referring now to FIG. 3, a flow chart illustrating a deployment and configuration process 300 in accordance with exemplary embodiments is provided.

In step 310, information is received relating to a new sensor. The information may be received, for instance, by deployment manager 210 from provisioning device 208. The information relating to the new sensor may include, for example, a sensor identification and meta-data pertaining the sensor. This information could be related to location, sensor capabilities, and/or the manufacturer. In some embodiments, the sensor identification itself may provide information regarding capabilities and/or manufacturer. Further, additional information, such as battery specification or data format, may be retrieved by the deployment manager or related node based on the initial information received from the provisioning device 208. For instance, the deployment manager 210 may access another database using the manufacturer information. The obtained information of step 310 may be subsequently transmitted, for example, to the similarity database 216 and/or RD 202.

In step 320, deployment information relating to one or more existing sensors is obtained. For instance, the information may be obtained by the deployment manager 210 from one or more of similarity database 216 and RD 202. In some embodiments, for instance, where the deployment manager 210 and other nodes are co-located, the information may be obtained by accessing a local database that maintains the information from all the nodes.

In step 330, similarity information is determined for the new sensor based on the received information and the obtained deployment information. The similarity information may relate to one or more of capability, device location, and previous information transmissions.

In step 340, a sleeping pattern for the new sensor is determined. The sleeping pattern may be determined, for example, by deployment manager 210. In some embodiments, the sleeping pattern may be determined by calculating an initial sleeping pattern based at least in part on the similarity information, as well as topology information of sensor network, transmitting the initial sleeping pattern to another node, such as sleeping pattern configurator 206, and then receiving, from the sleeping pattern configurator node, the sleeping pattern for the new sensor.

In some embodiments, the sleeping pattern is determined such that the new sensor has a duty cycle or awake-state duration that is different than at least one of the existing sensors. An activation or deactivation of the new sensor (or entire sensor node 218) can be based, at least in part, on the sleeping pattern.

In step 350, the new sensor is configured in accordance with the sleeping pattern. The configuration may include, for example, transmitting the sleeping pattern from the deployment manager 210 to at least one of the resource directory 202, the sleeping pattern configurator 206, the request manager 214, the provisioning device 208, and the new sensor.

Figure 4:
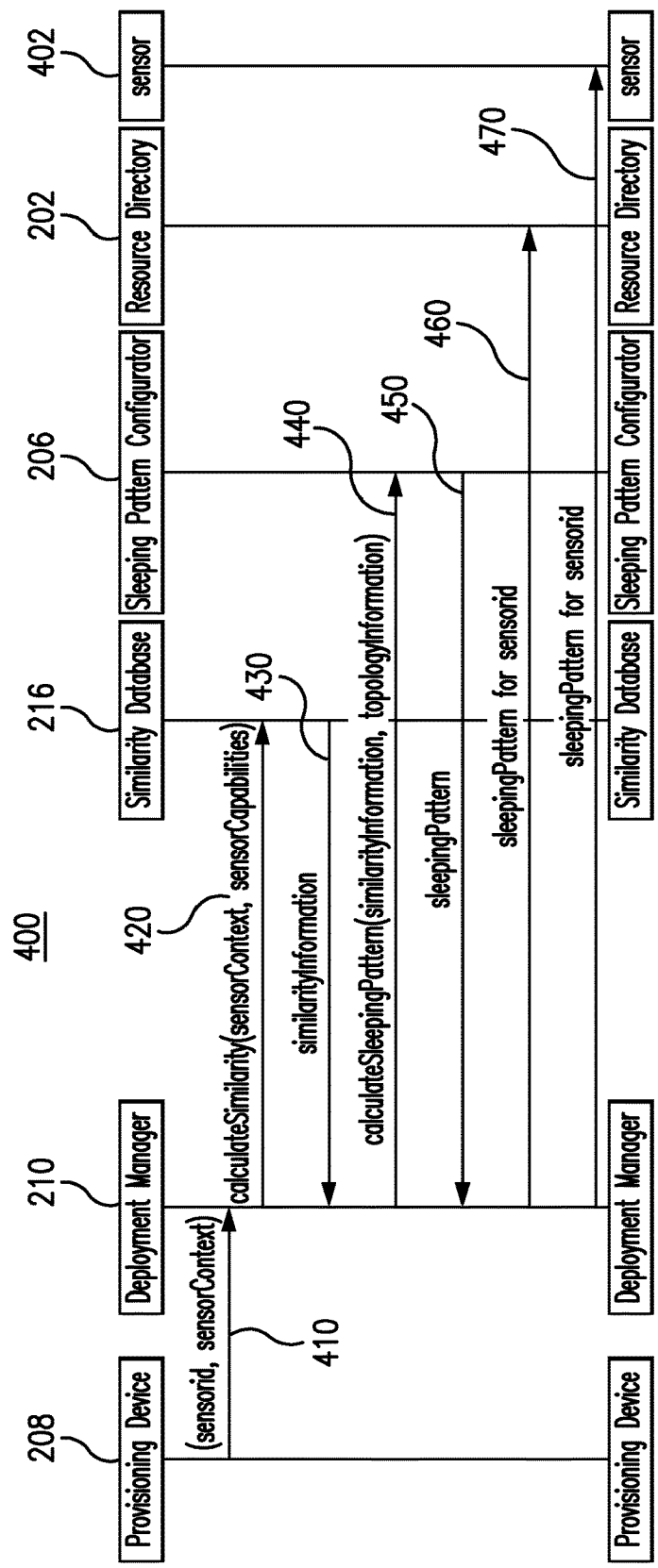
FIG. 4 is a signal diagram illustrating a deployment processes in accordance with exemplary embodiments.

Referring now to FIG. 4, a signal diagram illustrating a deployment processes in accordance with exemplary embodiments is provided. The diagram of FIG. 4 may illustrate, for instance, messages sent between specific nodes of sensor network 200 as part of the deployment and configuration process 300, for a new sensor 402. New sensor 402 may be for example, a new sensor unit, as well as some or all of a new sensor node.

The exemplary signal flow 400 of FIG. 4 begins when provisioning device 208 submits a sensor message 410 to the deployment manager 210. The message 410 may include, for instance, sensor identification information (sensorID) along with contextual information for the sensor (sensorContext). In some embodiments, sensorId is an automatically generated identification number for the particular sensor that is being recorded, while sensorContext comprises information about the sensor, such as its location and manufacturer.

The deployment manager 210 may then calculate the similarity of this new sensor 402 to other existing sensors that are already available in the system by contacting 420 the corresponding similarity database 216 for this particular deployment, for instance, in accordance with step 330 described above. The result of his calculation may be referred to as "similarityInformation," and stored thereafter in similarity database 216. The similarityInformation may be returned to the deployment manager 210 via message 430.

The deployment manager 210 may then calculate the sleeping pattern for the newly provisioned sensor, taking into consideration similarity information and topology information. For example, the sleeping pattern may be determined to ensure that the newly inserted sensor 402 will be asleep when an already existing sensor, such as a sensor of node 218, that provides similar functionality is awake. In some embodiments, this is achieved using the corresponding sleeping pattern configurator 206 for the deployment. For instance, in some embodiments, the deployment manager 210 may communicate the similarity and topology information to the sleeping pattern configurator 206 via a calculateSleepingPattern message 440. A sleeping pattern may then be returned in message 450. The product of these steps may be referred to as the sleeping pattern ("sleepingPattern"), which can be stored both in the enhanced RD 202, for instance, via message 460, as well as communicated to the corresponding sensor 402 in a message 470 for configuring the device.

By combining similarity data information and historical information on sensor access during the deployment process, a sleeping pattern for a newly added sensor can be determined. The sleeping pattern for that sensor can be calibrated in such a way that the newly added sensor is not awake when similar sensors in the same area are awake, and also so that the sensor is not working (i.e., in an awake state) more than is needed to adequately address information requests. For instance, if from a historical point of view, similar sensors do not receive many requests in this deployment, a new sensor may be deployed with a limited awake-time duty cycle.

Figure 5:
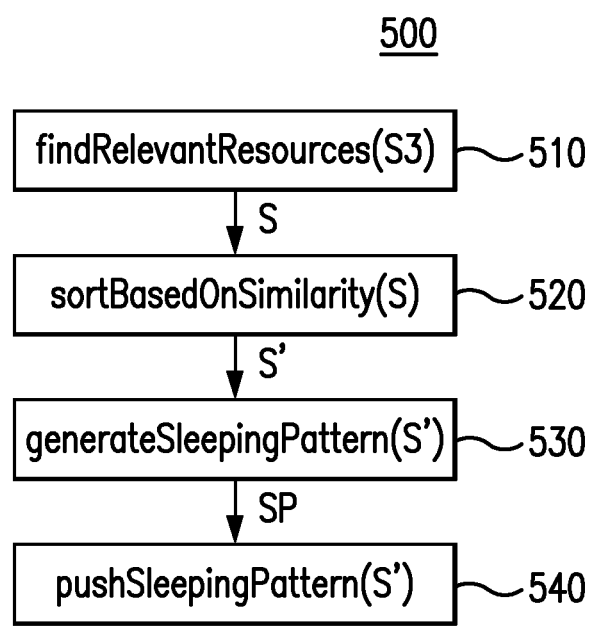
FIG. 5 is a flow chart illustrating a sleeping pattern generation process in accordance with exemplary embodiments.

In an exemplary deployment that already contains two temperature sensors, a user may be interested in adding a third. In the existing deployment of this example, Thermomteter1 is located 1 meter away from new Thermometer3 (being inserted), which is located 15 meters away from existing Thermometer2. In this example, Thermometer 1 already wakes up every 10 minutes for 5 minutes and Thermometer2 already wakes up every 60 minutes for 10 minutes Taking into consideration that, in this exemplary setup, the existing thermometers are relatively close to each other, for instance, based on the result of a range function that quantifies distance based on a threshold, then the newly added Thermometer3 may optimally receive a sleeping pattern that complements those of the sensors that are already available. This may be produced by a generateSleepingPattern function, which is illustrated in FIG. 5. The process 500 of FIG. 5 includes finding relevant resources (step 510), sorting the resources based on similarity (step 520), generating a sleeping pattern (step 530), and then pushing the sleeping pattern (step 540) to other nodes or sensors. Thus, in the scenario of the present example, the proposed sleeping pattern could be defined such that the new sensor would wake up, or activate its temperature sensing features, every 15 minutes for 10 minutes (15,10).

According to some embodiments, the deployment processes described herein may address several issues. First, where are the different sensor devices? It can be important to collect context about the different sensor devices, i.e., sensor context and topological information. Second, what are their capabilities? It can also be important to know the capabilities of such devices. For instance, it may be important to know that there are temperature sensors deployed that measure temperature in Celsius, and that they are located close by. This could be relevant for the purposes of estimating the similarity between sensors in the context of redundancy and requests to access resources. Third, what are their sleeping patterns? It can be important to know when a device is sleeping or not, in order to avoid powering it ahead of time. This may also important for the purposes of reconfiguring its sleeping cycles.

Figure 6:
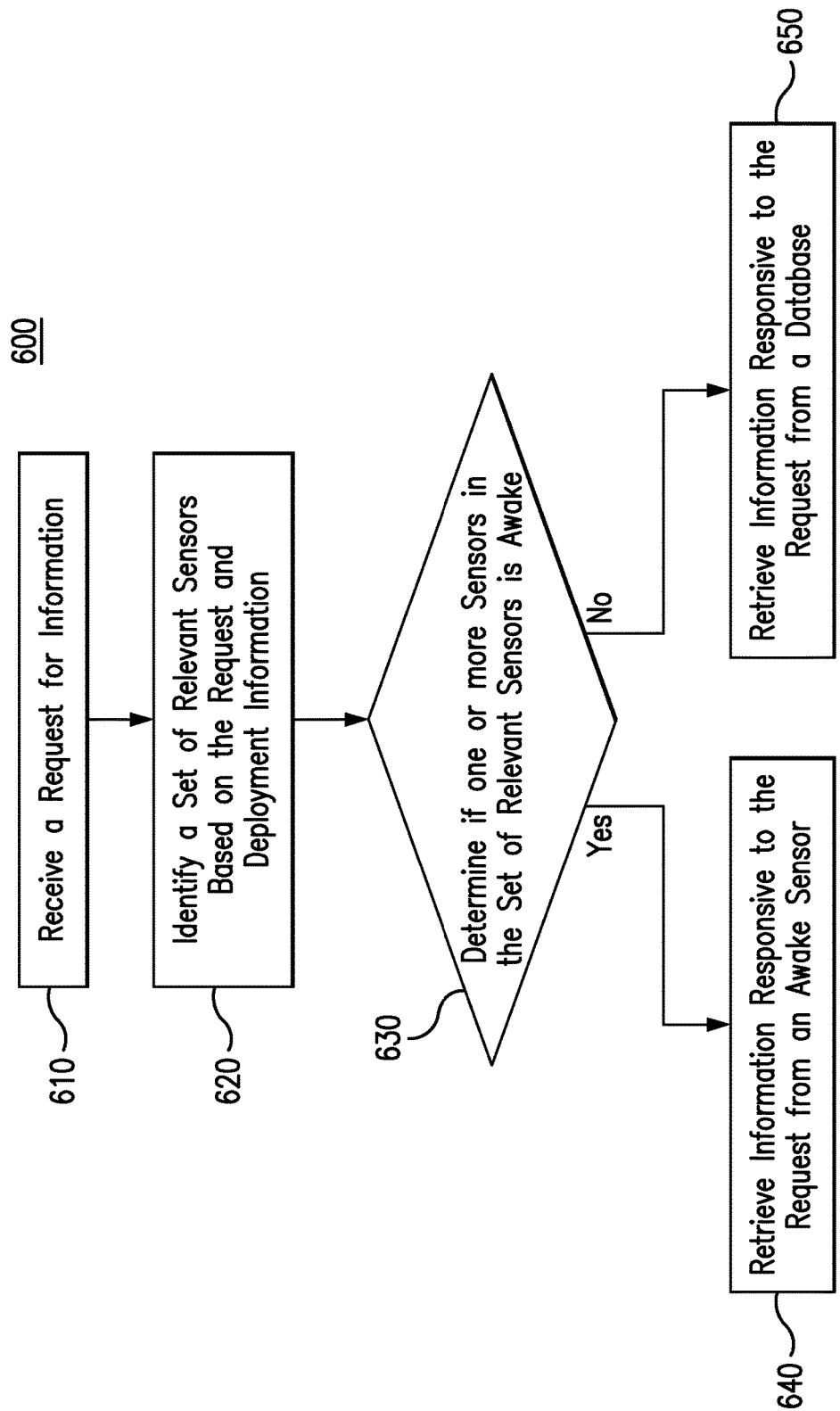
FIG. 6 is a flow chart illustrating an information retrieval process in accordance with exemplary embodiments.

Referring now to FIG. 6, a flow chart illustrating an information retrieval process in accordance with exemplary embodiments is provided. This process may be performed, for instance, by request manager 214.

In step 610, a request is received for information. The request may be received, for instance, from an external application, such as application 108, seeking data from one or more sensors of network 200. For example, the request may specify one or more types of information to be accessed and retrieved.

In step 620, a set of relevant sensors is identified based on the received request, as well as deployment information. In some embodiments, identifying a set of relevant sensors includes generating a set of sensors based on the information request and sorting the set of sensors based on deployment information. Deployment information may include, for example, one or more of device capability, device location, and prior information transmission from the device. Further, deployment information can include similarity information with respect to other relevant sensors.

In step 630, it is determined whether one or more sensors in the set of relevant sensors is awake. If so, in step 640, information responsive to the request is received from an awake sensor, such as sensor 218. If not, in step 650, information responsive to the request is received from a database, such as MP 204.

Figure 7:
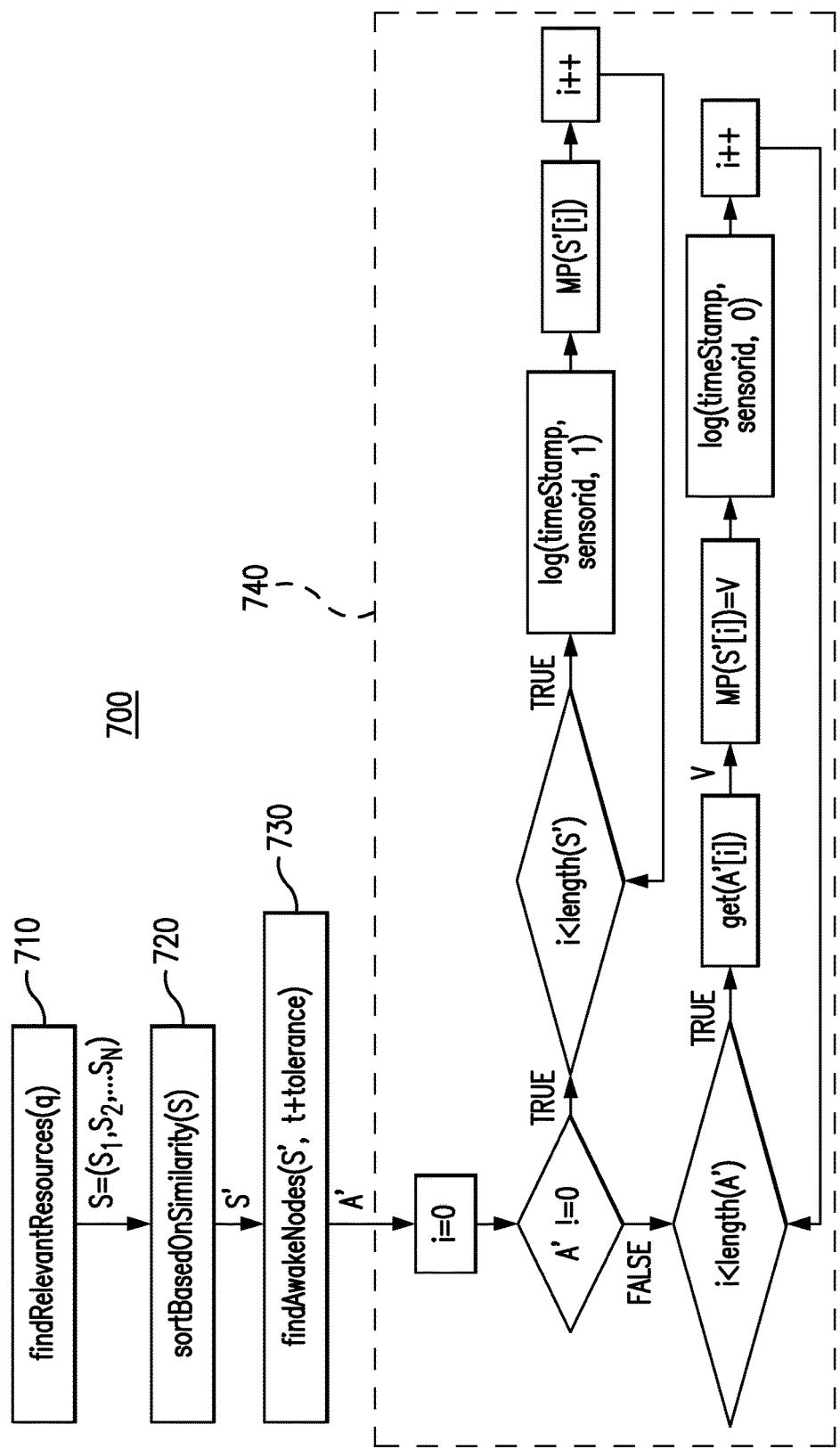
FIG. 7 is a flow chart illustrating an information retrieval process in accordance with exemplary embodiments.

Referring now to FIG. 7, a flow chart illustrating an information retrieval process in accordance with exemplary embodiments is provided. The flow chart describes a process that may run, for instance, within the request manager 214 that is responsible for retrieving information from the various sleepy devices available in network 200.

A request manager 214 may receive a request for information. The request may be comprised of, for example, components q and t (R(q,t)), where q is the query and t defines the requested period of periodic responses that the request manager should provide to the user requesting this information. An example of a query could be "all temperatures in building 30, floor 7;" the period could be provided in units of time, for instance "1 second," "1 day," or "5:00 pm." One of ordinary skill in the art will recognize that any number of well-known query languages could be used for this request; natural language is used in this example for the purposes of simplicity.

When a query (q) is received by the request manager 214, in this example, the first step 710 is to find relevant sensors based on the query. The result of this process may be a set of one or more sensors "S" that have capabilities that correspond to the query.

The next step 720 is to sort the set, S, based on similarity. The sort function is illustrated as "sortBasedOnSimilarity (S)," which produces S'. In S', devices are organized, for instance, from most to least similar to the information of the query.

The next step 730 is to determine which of those devices are awake based on the received period, t. This functionality may be referred to as "findAwakeNodes," and may be executed as a function of the set, S', and received period. The period may be within a given tolerance to allow for a degree of freedom in the search space, i.e., findAwakeNode(S',t+tolerance). This produces A', which is a set of awake devices.

As shown in the processes of step 740, if A' is not an empty set, then the actual devices can used, and information is retrieved directly from them by, for example, the request manage 214 executing a get function, which may result in the request manager 214 transmitting an Hypertext Transfer Protocol (HTTP) Get request message to the devices. However if A' is empty, then a database access function is used and instead of retrieving this information from the actual device, it is received from a database, such as MP 204 instead.

Additionally, for instance subsequently or in parallel the process 700, a reconfiguration procedure may be triggered in order to reconfigure one or more sleeping devices. A purpose of this reconfiguration may be to enable a learning system that can adapt to application requests. For example, if an application request that resources for certain sensors in an area are reported every t seconds, and the previous process of locating such sensors has produced no candidate sensor nodes (or only a limited number), then a reconfiguration step may re-task the sleeping sensors to stay awake for longer periods time. Similarly, it may adjust their duty cycle such that, for example, there is a guarantee that at least N sensors and/or sensor nodes would be available upon a subsequent application request.

According to some embodiments, the adjustment of duty cycles or duration of the awake-state can be based on sensor node battery information. For instance, a low battery level may exclude a sensor node from reconfiguration, or set an upper limit to how often a sensor node/sensor is awake. The reconfiguration can also take into account the estimated or actual clock drifts of individual sensor nodes, and adjust the awake period length and start time accordingly. In some embodiments, this information may also be part of the associated RD 202 sleeping pattern information.

In some embodiments, the reconfiguration of sensor node/sensor sleeping cycles can also take place periodically. For instance, a schedule may be implemented for regularly updating sensor and sensor node information, as well as their corresponding sleeping patterns. Use of regular updates may help ensure that relevant nodes/sensors are awake when an expected application request is received.

In some embodiments, a sensor may be configured to access specific resources, in a specific format, and it may be assumed that the sensor measures where the sensor is located (e.g. temperature, in Celsius, and located in building 30, floor 7). This information may be stored in the RD 202. This information can be taken into consideration when implementing findRelevantResources 510, and then again using sortBasedOnSimilarity 520. Thus, these resources, format, and location will be available in S'.

In some embodiments, additional information that may be known, or otherwise obtained, about a sensor includes the point(s) in time when a sensor wakes up (i.e. every 20 minutes) and how long it stays awake (i.e. for 5 minutes). Again, in some embodiments, this information is also available in RD 202, for example, it may have been recorded during the deployment phase.

In some embodiments, additional information that may be known, or otherwise obtained, about a sensor includes the rate at which a sensor's battery life is draining. This may be obtained, for example, because a sensor's battery life is reported when the sensor wakes up. A comparison can be made between a sensor's current battery life and previously reported battery life, generating an estimate of the battery loss rate. This rate can be computed in a number of ways, for example by using Euler's backwards formula:

$$\frac{dy}{dx} = \frac{CurrentValue - PreviousValue}{CurrentTimeStamp - PreviousTimeStamp}. \quad (1)$$

This computation (computeBatteryLoss) may be done at the sleeping pattern configurator 206.

In some embodiments, once a sensor wakes up, it reports to the sleeping pattern configurator 206 and during this reporting phase, it also checks if there is a new sleeping pattern that it needs to download. A new sleeping pattern could be the product of the reconfiguration process. In some embodiments, the new sleeping pattern is the product of a regularly scheduled reconfiguration process.

In some embodiments, additional information that may be known, or otherwise obtained, about a sensor includes how many requests a sensor has received, when these requests have been made, and whether or not these requests went to the actual sensor, or if they went to MP 204 instead. Such information may be stored, for example, as shown in Table 1:

| Timestamp | sensorId | Hit/miss |
|---|---|---|
| 2013-02-10 15:30 | T1 | 1 |
| 2013-02-12 16:30 | T2 | 0 |

This information may also be recorded in the resource directory 202. This information may be used by the sleeping pattern configurator 206 or the periodic reconfiguration process.

Figure 8:
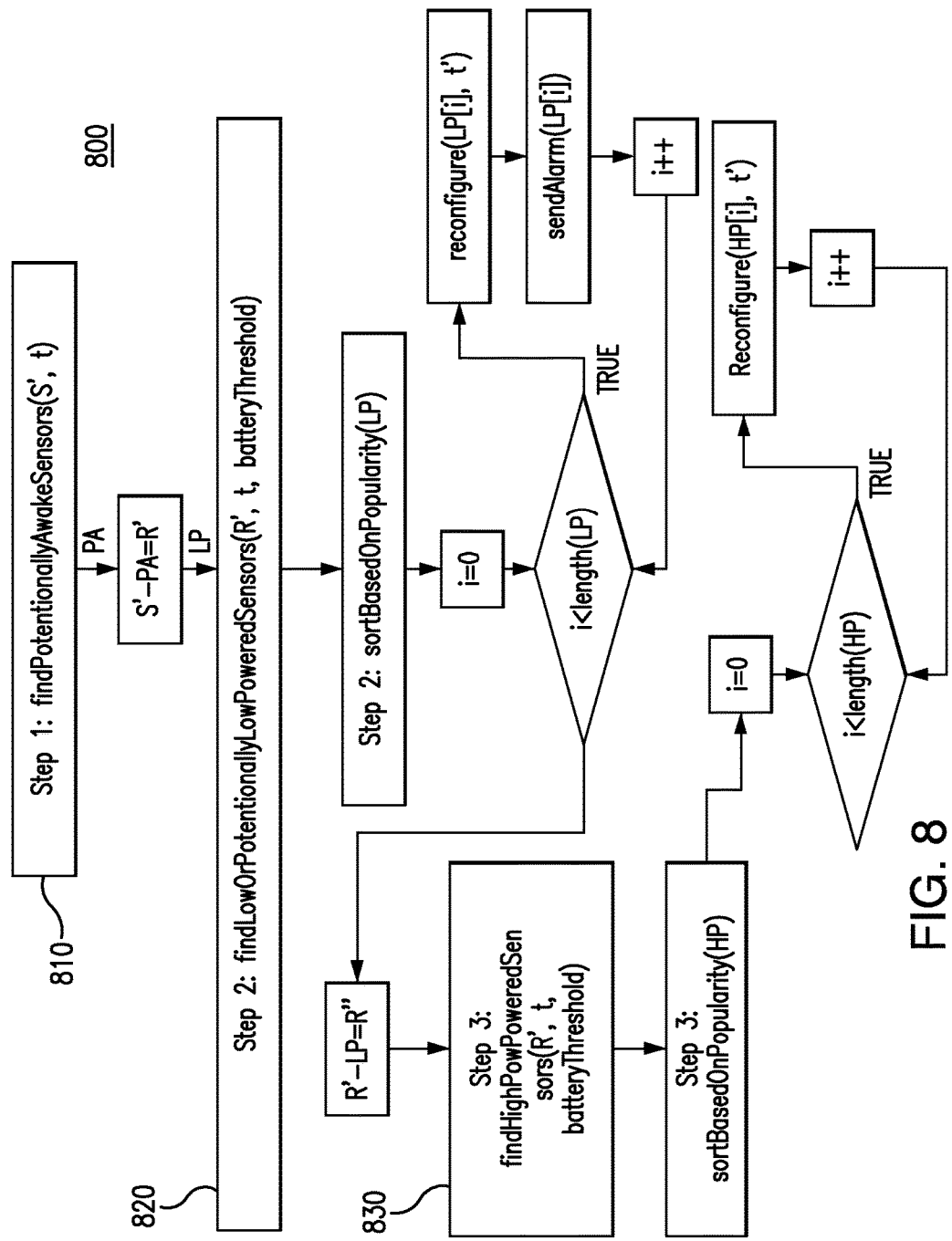
FIG. 8 is a flow chart illustrating a reconfiguration process in accordance with exemplary embodiments.
Figure 9A:
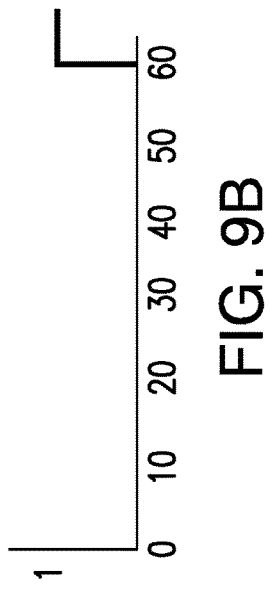
FIGS. 9A-D illustrate exemplary duty cycles.
Figure 9B:
Figure 9C:
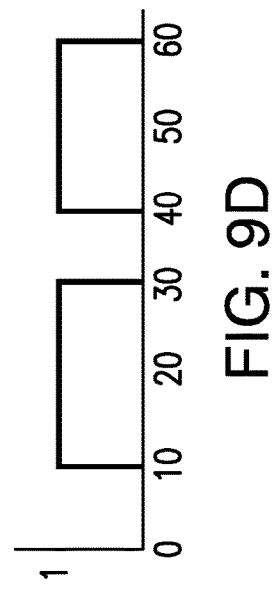
Figure 9D:
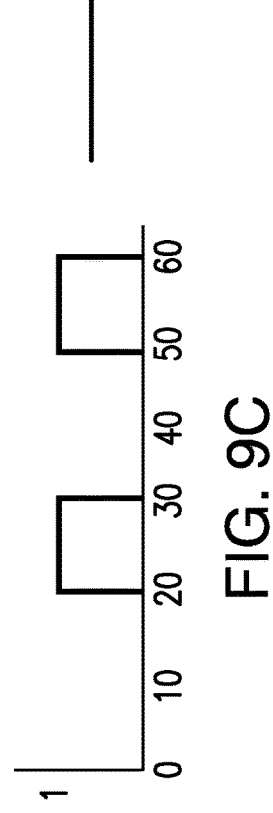

Referring now to FIG. 8, a flow chart illustrating a reconfiguration process 800 in accordance with exemplary embodiments is provided. The process may be performed, for instance, in one or more of request manager 214, sleeping pattern configurator 206, and/or deployment manager 210.

According to some embodiments, in the process of reconfiguring one or more sensors and/or sensor nodes, it is important to identify those devices that are going to be awake, either in the next phase of the reporting cycle (related to what the user has specified in query q) or in the time in between, since those sensors are going to provide the most up-to-date reading to MP 204 when they wake. It is possible that these sensors do not need to be reconfigured, and therefore, can be removed from S' in some instances. In step 810, a process is run to identify potentially awake sensors in a given set for a period, illustrated as "findPotentiallyAwakeSensors(S',t). A second set, R', may be produced based on the results of the findPotentiallyAwakeSensors process, PA, and the initial set:

$$S' - PA = R' \quad (2).$$

In step 820, those sensors that either do not, or will not have enough battery life to fulfill a request, or for the upcoming reporting cycles, are identified. In some embodiments, these sensors report their current value as soon as they wake up, and their sleeping pattern is reconfigured so that they are asleep more often. Additionally, an alarm may be sent to the administrator regarding these sensors. For instance, the alarm may indicate that the sensor or corresponding sensor node may have an error or otherwise require service. In certain aspects, sensors are ranked based on how popular they are, i.e., how many requests they receive. It may be optimal for the administrator to improve battery life on the most popular sensors first. The administrator may re-charge or replace the battery for a sensor.

In some embodiments, it may be advantageous to identify 830 those sensors that have sufficient battery life, but are often sleeping during a majority of, or important, requests. In some examples, their sleeping pattern should be reconfigured such that they are available in the next reporting cycles. In this step 830, it may also be important to rank sensors based on popularity in order to avoid having a very popular sensor that has a lot of battery life sleeping when requests are being made towards that sensor. It may also be advantageous to configure network 200 such that popular sensors don't serve the requests themselves in order not to be drained of battery, but instead go to sleep and let the mirror proxy 204 serve the requests.

An exemplary change in duty cycle/awake state is illustrated in FIG. 9. In this example, a sensor's duty cycle is as illustrated in FIG. 9A. In order to limit how often this sensor is awake, perhaps because the sensor has a limited battery life, a reconfiguration could, for example, adjust its sleep pattern such that it wakes up once for 5 minutes, every 60 minutes as shown in FIG. 9B. In another example, a sensor having the duty cycle illustrated in FIG. 9C, which wakes up every 20 minutes and stays awake for 10, may be adjusted to the cycle shown in FIG. 9D, where the sensor wakes up every 10 minutes and stays awake for 30 minutes. This adjustment could be made, for instance, to ensure that a popular sensor, or sensor with significant battery life, is available more often. More complex duty cycles are also possible. In some embodiments, complex time intervals are represented by inputting arrays of two numbers, one number expressing when the sensor wakes up, the other for how long the sensor should stay awake.

In some embodiments, the proposed reconfiguration process can be implemented as a policy and stored in a policy server. The policy server may be embodied as a separate and distinct device, or for instance, embodied as part of one or more of request manager 214, sleep pattern configurator 206, and/or deployment manager 210. As such, the proposed system can have access to a variety of different policies that determine different ways of reconfiguring a set of sleeping sensors towards different goals. For instance, a policy may define a reconfiguration schedule.

Figure 10:
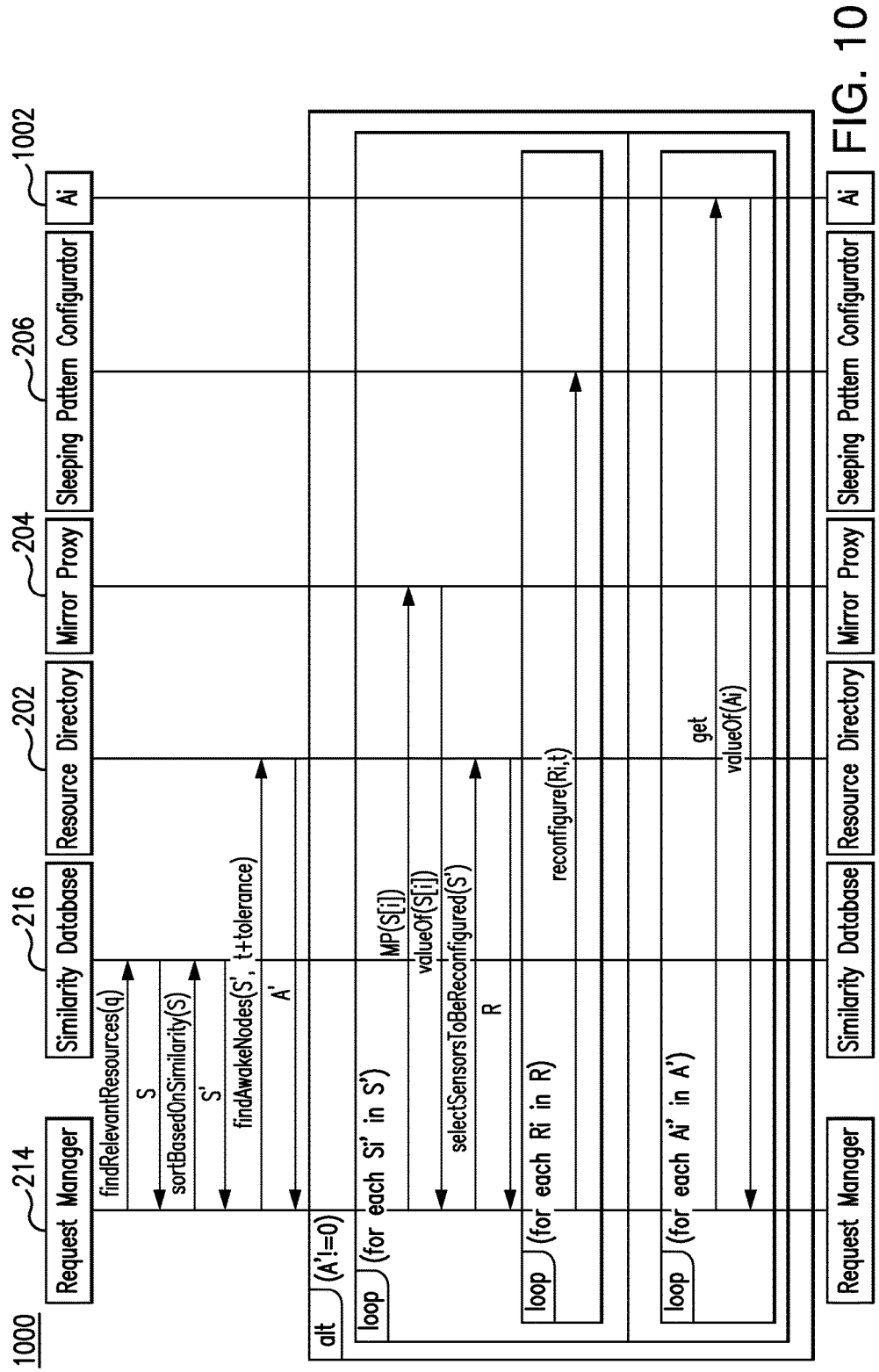
FIG. 10 is a signal diagram illustrating a messaging process in accordance with exemplary embodiments.

Referring now to FIG. 10, a signal diagram illustrating a messaging process in accordance with exemplary embodiments is provided. In this example, the sequence diagram demonstrates the aforementioned algorithm from a message exchange perspective regarding a new sensor 1002. The illustrated messages are communicated between request manager 214, similarity database 216, resource directory 202, mirror proxy 204, and sleeping pattern configurator 206.

Figure 11:
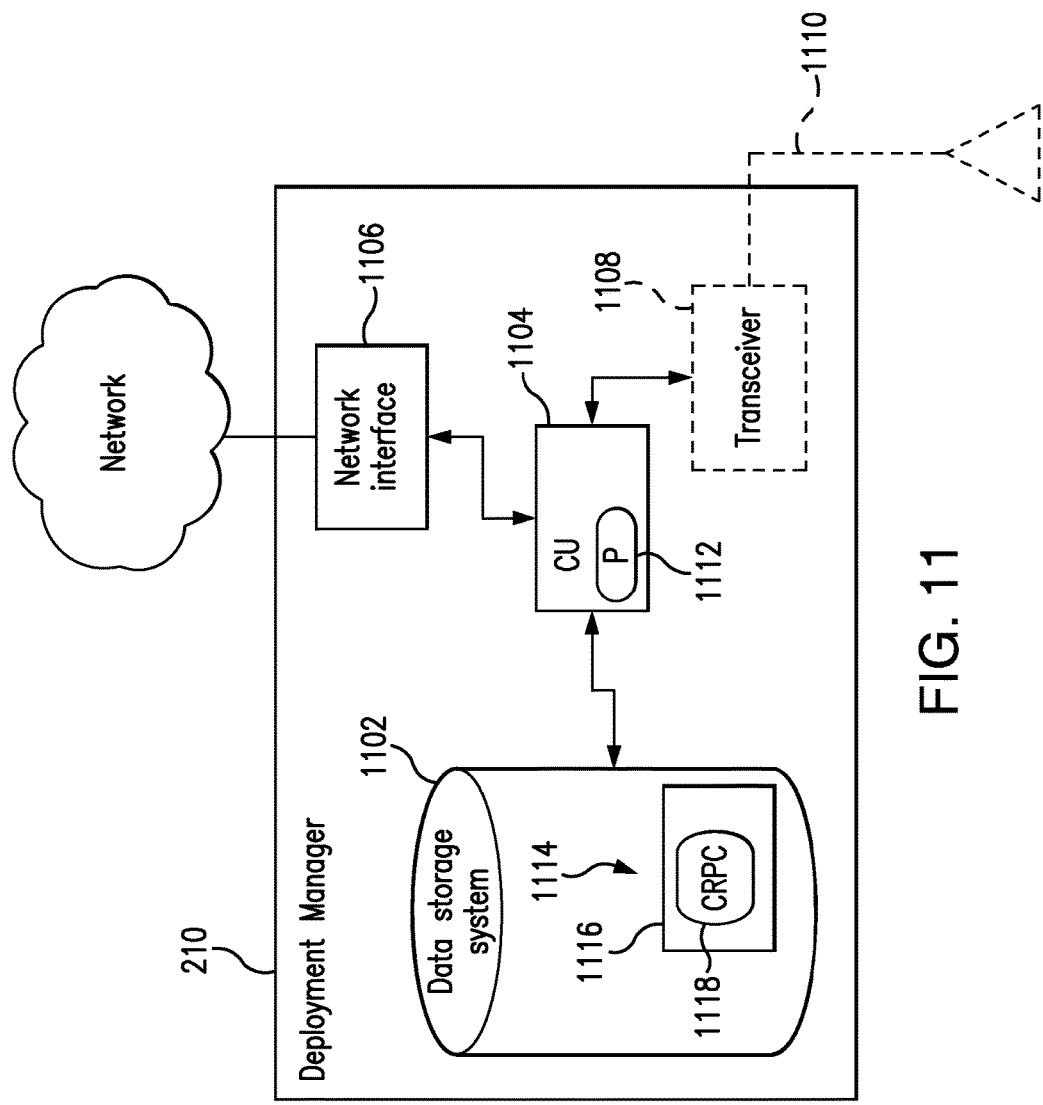
FIG. 11 is a block diagram of a deployment manager in accordance with exemplary embodiments.

FIG. 11 illustrates a block diagram of an example deployment manager 210. In the embodiment shown in FIG. 11, deployment manager 210 includes: control unit (CU) 1104 (e.g., a data processing system), which may include one or more processors (P) 1112 (e.g., microprocessors) and/or one or more circuits, such as an application specific integrated circuit (ASIC), Field-programmable gate arrays (FPGAs), etc.; a network interface 1106 for connecting (physically and/or wirelessly) to network 200 so that deployment manager may communicate with the other node of network 200; a data storage system 1102, which may include one or more computer-readable data storage mediums, such as non-volatile memory unit (e.g., hard drive, flash memory, optical disk, etc.) and/or volatile storage apparatuses (e.g., dynamic random access memory (DRAM)).

In embodiments where control unit 1104 includes a processor 1112 (e.g., a microprocessor), a computer program product 1114 may be provided, which computer program product includes: computer readable program code 1118 (e.g., instructions), which implements a computer program, stored on a non-transitory computer readable medium 1116 of data storage system 1102, such as, but not limited, to magnetic media (e.g., a hard disk), optical media (e.g., a DVD), memory devices (e.g., random access memory), etc. In some embodiments, computer readable program code 1118 is configured such that, when executed by control unit 1104, code 1118 causes the control unit 1104 to perform steps described herein (e.g., steps shown in FIGS. 3 and/or 6).

In some embodiments, deployment manager 210 is configured to perform steps described above without the need for code 1118. For example, control unit 1104 may consist merely of specialized hardware, such as one or more application-specific integrated circuits (ASICs). Hence, the features of the present invention described above may be implemented in hardware and/or software. For example, in some embodiments, the functional components of the node described above may be implemented by control unit 1104 executing program code 1118, by control unit 1104 operating independent of any computer program code 1118, or by any suitable combination of hardware and/or software.

Figure 12:
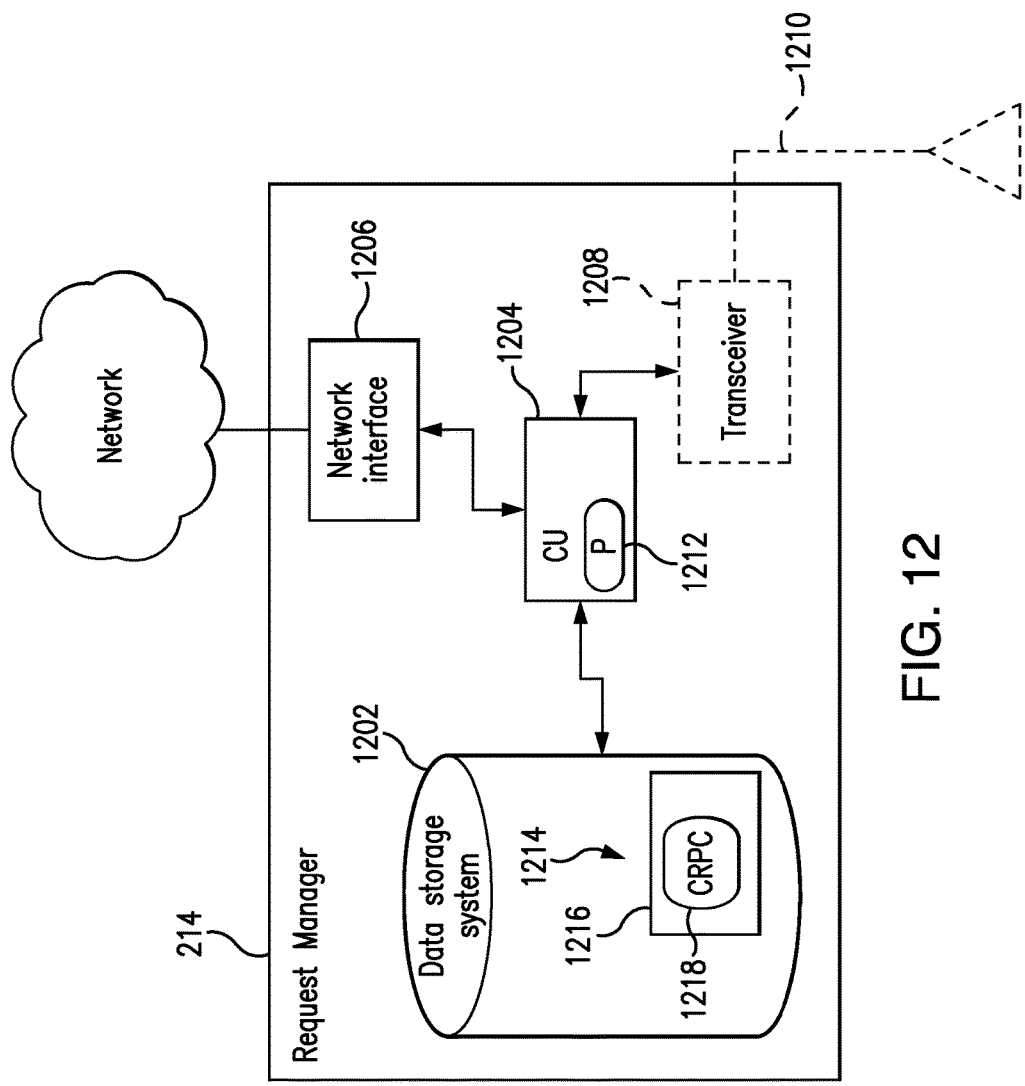
FIG. 12 is a block diagram of a request manager in accordance with exemplary embodiments.

FIG. 12 illustrates a block diagram of an example request manager 214. In the embodiment shown in FIG. 12, request manager 214 includes: control unit (CU) 1204 (e.g., a data processing system), which may include one or more processors (P) 1212 (e.g., microprocessors) and/or one or more circuits, such as an application specific integrated circuit (ASIC), Field-programmable gate arrays (FPGAs), etc.; a network interface 1206 for connecting (physically and/or wirelessly) to network 200; a data storage system 1202, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where control unit 1204 includes a processor 1212 (e.g., a microprocessor), a computer program product 1214 may be provided, which computer program product includes: computer readable program code 1218 (e.g., instructions), which implements a computer program, stored on a computer readable medium 1216 of data storage system 1202, such as, but not limited, to magnetic media (e.g., a hard disk), optical media (e.g., a DVD), memory devices (e.g., random access memory), etc. In some embodiments, computer readable program code 1218 is configured such that, when executed by control unit 1204, code 1218 causes the control unit 1204 to perform steps described herein (e.g., steps shown in FIGS. 3 and/or 6).

In some embodiments, request manager 214 is configured to perform steps described above without the need for code 1218. For example, control unit 1204 may consist merely of specialized hardware, such as one or more application-specific integrated circuits (ASICs). Hence, the features of the present invention described above may be implemented in hardware and/or software. For example, in some embodiments, the functional components of the node described above may be implemented by control unit 1204 executing program code 1218, by control unit 1204 operating independent of any computer program code 1218, or by any suitable combination of hardware and/or software.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for deploying a new sensor in a sensor network having an existing sensor, comprising:
receiving information relating to said new sensor;

obtaining deployment information relating to one or more existing sensors;

determining similarity information for said new sensor based on said received information relating to said new sensor and said obtained deployment information relating to said existing sensor;

based at least in part on said similarity information, determining a sleeping pattern for said new sensor such that said new sensor has a duty cycle or awake-state duration that is different than at least one of said one or more existing sensors; and configuring said new sensor in accordance with said determined sleeping pattern, wherein said determining a sleeping pattern comprises:
calculating an initial sleeping pattern based at least in part on said similarity information and topology information of said sensor network;
transmitting said initial sleeping pattern to a sleeping pattern configurator; and
receiving, from said sleeping pattern configurator, said sleeping pattern for said new sensor that is different from said initial sleeping pattern.

2. The method of claim 1, wherein said information relating to said new sensor includes a sensor identification and contextual information.

3. The method of claim 1, wherein said information relating to said new sensor includes one or more of location, sensor capabilities, and manufacturer.

4. The method of claim 1, wherein an activation or deactivation of said new sensor is based at least in part on said sleeping pattern.

5. The method of claim 1, wherein said configuring comprises transmitting said sleeping pattern from a deployment manager to at least one of a resource directory, a sleeping pattern configurator, a request manager, a provisioning device, and said new sensor.

6. The method of claim 1, wherein the duty cycle or awake-state duration of said new sensor forces said new sensor to stay awake longer than a period defined by said new sensor's original deployment.

7. The method of claim 1, wherein the duty cycle or awake-state duration of said new sensor is different from the at least one or more existing sensors that are similar to the new sensor in a same area as said new sensor.

8. The method of claim 1, wherein said received information comprises popularity information of said new sensor; and
wherein determining said sleeping pattern is based at least in part on said popularity information of said new sensor.

9. A deployment apparatus comprising:
a network interface configured to communicate with a node of a sensor network;
a processor coupled with the network interface, wherein the processor is configured to perform operations comprising:
receiving through the network interface, information relating to a new sensor in the sensor network having an existing sensor;
obtaining deployment information relating to one or more existing sensors;
determining similarity information for said new sensor based on said received information relating to said new sensor and said obtained deployment information relating to said existing sensor;
based at least in part on said similarity information, determining a sleeping pattern for said new sensor such that said new sensor has a duty cycle or awake-state duration that is different than at least one of said one or more existing sensors; and
configuring said new sensor in accordance with said determined sleeping pattern, wherein determining a sleeping pattern for said new sensor comprises:
calculating an initial sleeping pattern based at least in part on said similarity information and topology information of said sensor network;
transmitting said initial sleeping pattern to a sleeping pattern configurator; and
receiving, from said sleeping pattern configurator, said sleeping pattern for said new sensor that is different from said initial sleeping pattern.

10. The deployment apparatus of claim 9, wherein said information relating to said new sensor includes a sensor identification and contextual information.

11. The deployment apparatus of claim 9, wherein said information relating to said new sensor includes one or more of location, sensor capabilities, and manufacturer.

12. The deployment apparatus of claim 9, where the processor is further configured to:
store said similarity information in a similarity database.

13. The deployment apparatus of 15, wherein an activation or deactivation of one or more resources of said new sensor is based at least in part on said sleeping pattern.

14. The deployment apparatus of claim 9, wherein configuring said new sensor in accordance with said determined sleeping pattern comprises transmitting said sleeping pattern to at least one of a resource directory, a sleeping pattern configurator, a request manager, a provisioning device, and said new sensor.

15. A computer program product comprising a non-transitory computer readable medium storing computer code which, when run on at least one processor of an apparatus, causes the apparatus to:
receive information relating to a new sensor in a sensor network having an existing sensor;
obtain deployment information relating to one or more existing sensors;
determine similarity information for said new sensor based on said received information relating to said new sensor and said obtained deployment information relating to said existing sensor;
based at least in part on said similarity information, determine a sleeping pattern for said new sensor such that said new sensor has a duty cycle or awake-state duration that is different than at least one of said one or more existing sensors; and
configure said new sensor in accordance with said determined sleeping pattern,
wherein the computer program product when run on the at least one processor of the apparatus further causes the apparatus to:
calculate an initial sleeping pattern based at least in part on said similarity information and topology information of said sensor network;
transmit said initial sleeping pattern to a sleeping pattern configurator; and
receive, from a sleeping pattern configurator of the sensor network, said sleeping pattern for said new sensor that is different from said initial sleeping pattern.

* * * * *